Sept. 26, 1950 W. B. JOHNSEN 2,523,908
FILM HOLDER
Filed Sept. 3, 1947 2 Sheets-Sheet 1
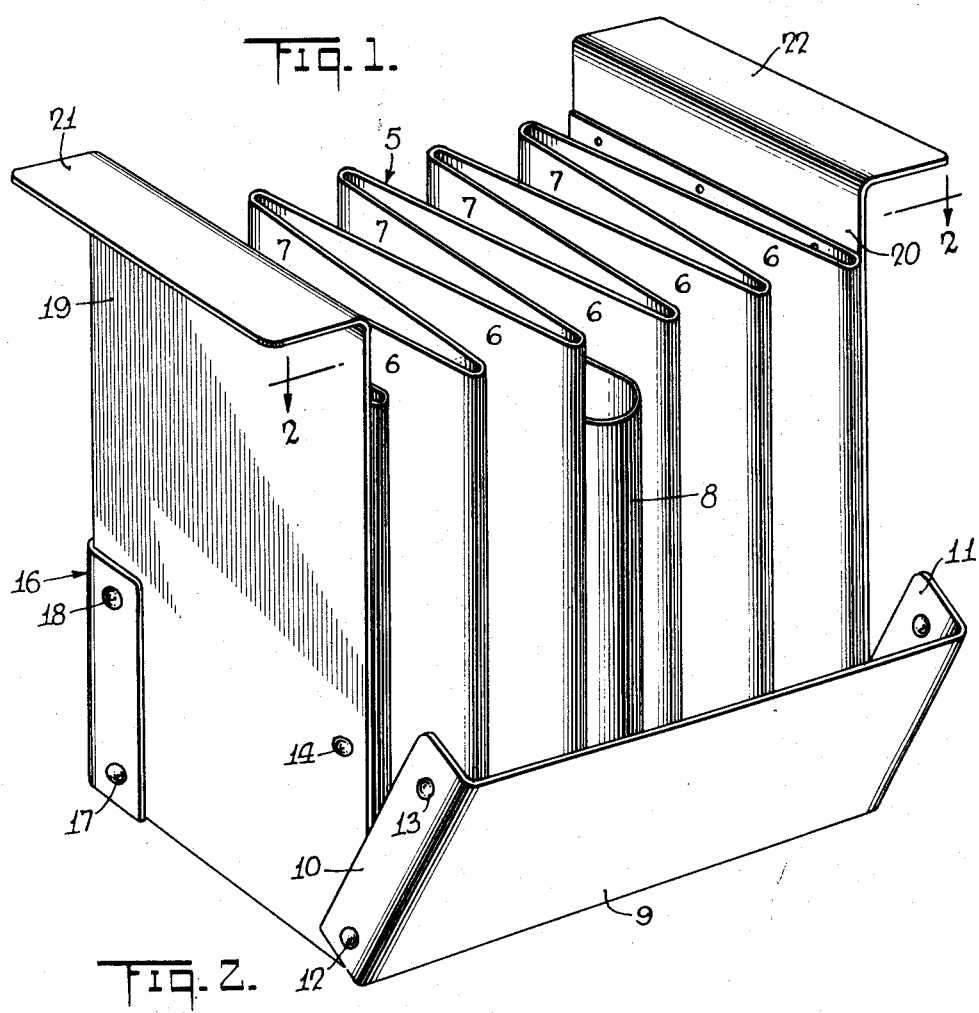
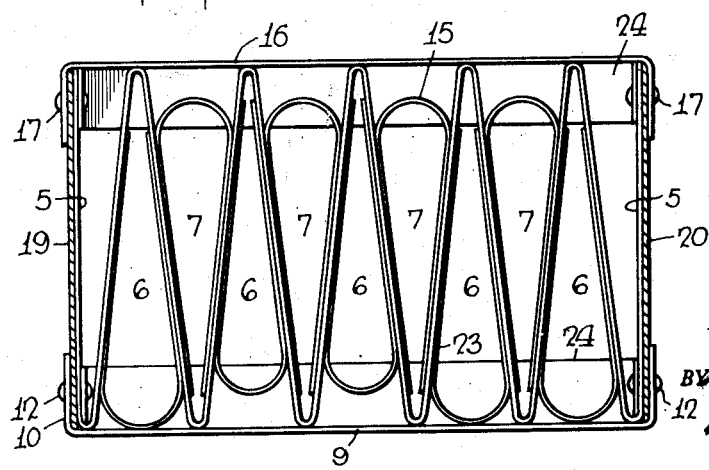
INVENTOR.
William B. Johnsen
BY
ATTORNEYS Sept. 26, 1950 W. B. JOHNSEN 2,523,908
FILM HOLDER Filed Sept. 3, 1947 2 Sheets-Sheet 2

INVENTOR.
William B. Johnsen
BY
ATTORNEYS.

Patented Sept. 26, 1950

2,523,908

UNITED STATES PATENT OFFICE 2,523,908

FILM HOLDER

William B. Johnsen, New York, N. Y., assignor to Rudman & Scofield, Inc., New York, N. Y., a corporation of New York Application September 3, 1947, Serial No. 771,922

5 Claims. (Cl. 95—100)

My invention relates to film-developing apparatus and in particular to a film holder for tank development of cut film or the like.

It is an object of my invention to provide an improved device of the character indicated.

It is another object to provide an improved film holder providing for ease of insertion of cut film and for adequate protection against loss or dislodgment of the film when the holder is submerged and agitated in a developing tank.

It is a general object of the invention to meet the above objects with a device that is simple and cheap to manufacture and which may be completely reliable in operation.

Other objects and various further features of the invention will be pointed out or will occur to those skilled in the art from a reading of the following specification with reference to the accompanying drawings. In said drawings:

Fig. 1 is a perspective view illustrating a film holder incorporating features of the invention;

Fig. 2 is a sectional view taken substantially in the plane 2—2 of Fig. 1; and

Figure 3:
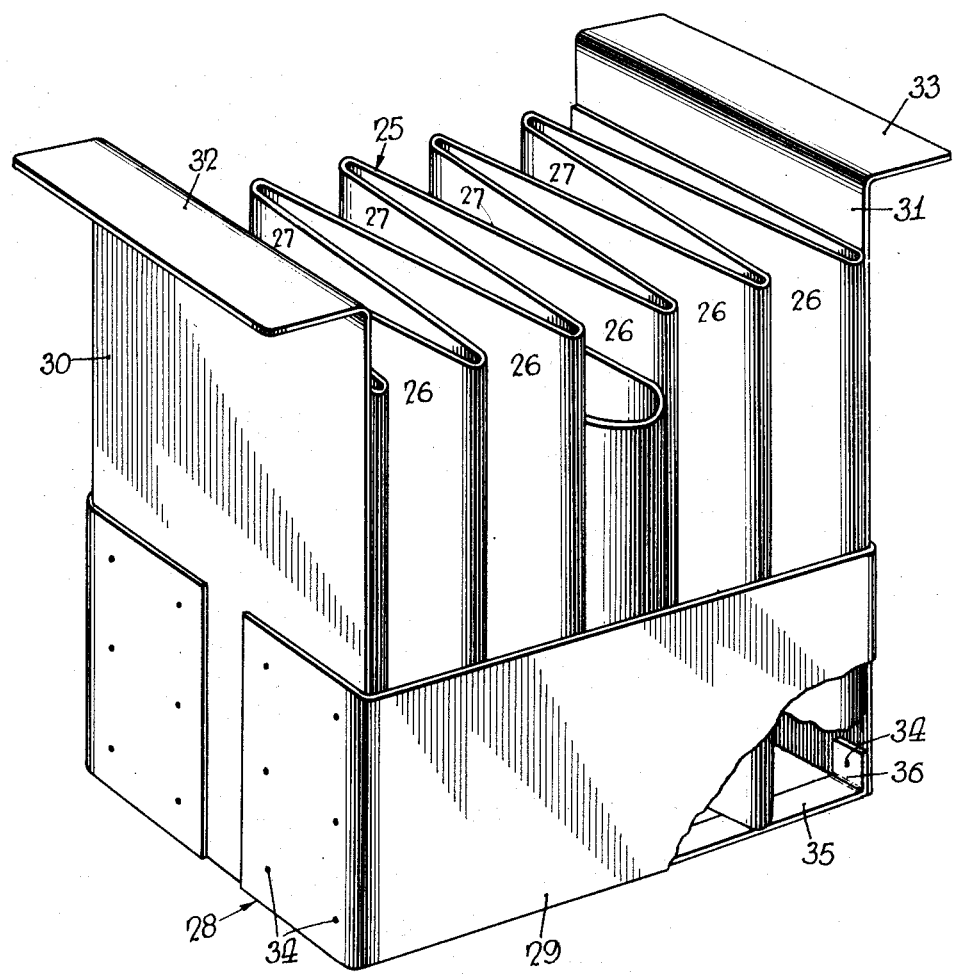
Fig. 3 is a perspective view of a modified form of the invention.

Briefly stated, my invention contemplates an improved film holder for cut film or the like, wherein the holder incorporates a plurality of pleats defining film-retaining chambers having longitudinally extending open mouths. The open mouths permit bent or gently folded cut film to be inserted end-first (emulsion side in) into the mouths, so that the walls of the chambers may graspingly support the pieces of the film. To prevent loss of film when the holder is submerged and agitated in the tank, the holder incorporates removable covering means to close off longitudinally extending parts of the mouths of the chambers. In one of the forms to be described, the holder is formed as a single unit, and the covering means includes a hinged plate which may be swung into a latched position effectively to close off the chamber mouths. In the other form, the film-retaining member is first loaded and then inserted into a framework which serves to close off parts of the chamber mouths.

Referring to Figs. 1 and 2 of the drawings, my invention is shown in application to a film holder incorporating a film-retaining member 5 of pleated or zig-zag folded construction. The construction is such as to define between adjacent folds a plurality of film-retaining chambers 6—7. The mouths of chambers 6—7 are preferably open for their full longitudinal width so that a piece of cut film 8 may be folded and inserted end-first (emulsion side in) into the mouth of one of chambers 6—7.

Ordinarily, when loading, the frictional grip of the film 8 on the walls of the chamber 6 into which it is loaded will be sufficient to retain the film 8 in place. However, during the developing process, that is, when submerged and agitated in a developing tank, I prefer to close off parts of the mouths of chambers 6—7 with removable covering means. In the form shown in Fig. 1, this covering means includes, for the chambers 6, a covering member or plate 9 hingedly supported at the bottom of the holder on a longitudinally extending axis. The plate 9 may include flanged ends 10—11, each of which may be attached to the film holder by rivets or other hinge-pintle means 12.

It will be clear that in the down position the plate 9 may leave the mouths of chambers 6 completely open for ready insertion of cut film 8, as in the manner described. When all the chambers 6 of one side have been loaded, the cover plate 9 may be swung into covering position and, if desired, holding means in the form of snap detents 13—14 may hold such closed position. The same procedure may be employed for loading, and for securing in loading position, cut film 15 supported in chambers 7 of the other side of the film holder. In the latter case a covering member or plate 16 may be hinged as at 17 and resiliently held in closed position, as by snap-action means 18.

In order that the film holder which has been described may be more readily adaptable to use in a developing tank, the ends of the film-retaining member 5 may be secured to or provided with end plates 19—20 having outwardly extending flange or bracket portions 21—22 for proper support in a developing tank. It will be understood that the flanges 21—22 may be employed for suspending the holder 5 in the tank or for agitation of the holder in the tank.

It will be appreciated that for the form described, the loading of film into chambers 6—7 is a relatively simple procedure. The covering members 9—16 are preferably down or open while the folded cut film is inserted into the mouths of the chambers 6—7. Should it happen that the bend in any particular piece of film projects outside the mouth of one of the chambers 6—7, this fact need be of no consequence since the swinging of a cover plate, such as the plate 9, into closed position will automatically result in engaging the projecting end of the piece of film and in thereafter pushing the film into its proper place, fully enclosed within its retaining chamber. In such event, a piece of film, as at 23 (Fig. 2), although in contact with the cover plate 9 and with the walls of its chamber 6, may have complete access to developer over its entire emulsion surface for proper development, as will be clear.

Although the described structure may in many cases prove adequate, I prefer in the form shown to provide additional rigidity, particularly with regard to spacing and supporting the end plates 19—20 near the points at which the side plates 9—16 are hingedly supported. In the form shown, this added rigidity is afforded by a pair of longitudinally extending strips 24—24 provided with lugs at each end, for attachment to the frame of the film holder as by means of rivets 12—17.

In Fig. 3 I show a modified form of the invention which includes a film-retaining member 25 generally similar to the retaining member 5 of Figs. 1 and 2, but the film-retainer member 25 is bodily removable from a supporting cradle or box 28. The member 25 may thus comprise zigzag folds or pleats so as to define a number of film-retaining chambers 26 on one side and a number of chambers 27 on the other side. The chambers 26 to 27 are preferably open for substantially the full longitudinal extent of their mouths for the ready reception of folded cut film, and these open mouths may be in effect closed by removable covering means.

In the form shown, the covering means comprises a cradle or box frame 28 into which the pleated holder 25 may be inserted, as from above the frame 28. The frame 28 may be merely a relatively open-sided box having sides, such as the side 29, to cover parts of the mouths of chambers 26 sufficiently to retain the film in place. The longitudinal ends of the frame 28 may again comprise end plates 30—31 having outwardly directed supporting flanges 32—33. In the form shown, the side plates (such as the side 29) are formed as straps bent around the plates 30—31 and secured thereto as by spot welds 34. Preferably, retaining means are included at the bottom of the frame 28 to provide suitable flooring for the retaining member 25. Such flooring may be effected by strip members, such as the strip 35. The strip 35 may be bent up at the ends to provide lugs, such as the lugs 36, which may be spot welded or otherwise secured to the rest of the assembly.

In use of the film holder of Fig. 3, film is loaded into member 25, while the latter is removed from the cradle or box 28. The loaded retaining member 25 is then inserted into box 28 so as to rest on bottom strips 35. After development, member 25 may be withdrawn and the wet film easily removed through the then-open mouths of chambers 26—27.

It will be appreciated that I have described relatively simple film holders which are particularly adapted to the quick and efficient handling of cut film. Both the forms described may very adequately secure the film in place during the developing process, and after development the covering means may open the mouths of all retaining chambers so as to make for very simple unloading of wet film. In both forms of the invention, it will also be appreciated that the bottom of the film holder can be very substantially open so as to permit the fullest possible flooding of emulsion surfaces by fresh and active developing agents.

While I have described my invention in detail for the preferred forms shown, it will be understood that modifications may be made within the scope of the invention as defined in the appended claims.

I claim:

1. In a film holder, a pair of opposed end plates at the ends of said holder, film-retaining means of zig-zag construction between said plates, the folds of said plates defining film-retaining chambers, said chambers being open for substantially the longitudinal extent of the mouths thereof, longitudinal base means beneath said film-retaining means and joining the end plates of said film-retaining means, and cover-plate means hinged to said end plates for effectively closing off the mouths of said chambers.

2. In a film holder, a pair of end plates at the ends of said holder, said plates having upper outwardly flaring brackets for supporting said holder in a developing tank, zig-zag film-retaining means between said plates and said retaining means defining a plurality of film-retaining chambers open at longitudinally extending mouths, each of said mouths being open for substantially the longitudinal extent thereof, removable covering means supported by said end plates and removably covering parts of the mouths of said chambers, whereby pieces of film may be folded and inserted into the mouths of said chambers and then held in position in said chambers by said covering means, and means extending between said end plates and closing off a relatively small part of the vertically open bottom ends of said chambers, whereby said last-defined means may not only serve to retain film against dropping out the bottom ends of said chambers but may also provide such open bottoms for said chambers as not to interfere with free vertical circulation of fluid in said chambers.

3. In a film holder, a film-retaining member of pleated construction defining a plurality of film-retaining chambers open for substantially the longitudinal extent of the widest portions thereof, removable covering means spanning the ends of said member and including a member hingedly fixed to one of said ends and extending for removable attachment to the other of said ends, said covering means covering longitudinally extending portions of the mouths of a plurality of said chambers.

4. In a film holder, a film-retaining member of pleated construction defining a plurality of film-retaining chambers open for substantially the longitudinal extent of the widest portions thereof, and removable covering means spanning the ends of said member and covering longitudinally extending portions of the mouths of a plurality of said chambers, said covering means including a member hingedly supported on an axis through both said ends, and said member being resiliently secured to one of said ends when in position to close off longitudinally extending parts of the mouths of some of said chambers.

5. In a film holder, a film-retaining member of pleated construction defining a plurality of divergent-mouthed longitudinally extending film-retaining chambers open for substantially the longitudinal extent of the widest portions thereof and open at the longitudinal ends thereof, removable covering means spanning the horizontal ends of said member and covering longitudinally extending portions of the mouths of a plurality of said chambers, and retaining means extending between said horizontal ends and closing off a relatively small part of the lower longitudinal ends of said chambers, whereby said retaining means may not only serve to retain film against dropping out the lower longitudinal ends of said chambers but may also provide such open ends for said chambers as not to interfere with the free circulation of fluid in said chambers.

WILLIAM B. JOHNSEN.

REFERENCES CITED

The following references are of record in the file of this patent:

UNITED STATES PATENTS

| Number | Name | Date |
|---|---|---|
| 902,940 | Carkhuff | Nov. 3, 1908 |
| 1,347,620 | Day | July 27, 1920 |
| 1,364,230 | Wu | Jan. 4, 1921 |
| 1,858,576 | Bornmann | May 17, 1932 |

FOREIGN PATENTS

| Number | Country | Date |
|---|---|---|
| 10,610 of 1902 | Great Britain | June 19, 1902 |
| 17,722 of 1903 | Great Britain | Sept. 17, 1903 |
| 83,240 | Austria | Mar. 25, 1921 |